United States Patent
Bestfleisch (10) Patent No.: US 11,347,682 B2
(45) Date of Patent: May 31, 2022

(54) DATABASE-DRIVEN ZERO DOWNTIME DATA MIGRATION

(71) Applicant: SAP SE, Walldorf (DE)

(72) Inventor: Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/019,942

(22) Filed: Sep. 14, 2020

(65) Prior Publication Data

US 2022/0083502 A1    Mar. 17, 2022

(51) Int. Cl.
| | | |
|---|---|---|
| *G06F 16/00* | (2019.01) | |
| *G06F 16/11* | (2019.01) | |
| *G06F 11/14* | (2006.01) | |
| *G06F 16/18* | (2019.01) | |
| *G06F 9/445* | (2018.01) | |
| *G06F 16/901* | (2019.01) | |

(52) U.S. Cl.
CPC ........ *G06F 16/119* (2019.01); *G06F 9/44589* (2013.01); *G06F 11/1466* (2013.01); *G06F 16/1873* (2019.01); *G06F 16/901* (2019.01)

(58) Field of Classification Search
CPC .. G06F 16/119; G06F 16/1873; G06F 16/901; G06F 9/44589; G06F 11/1466
See application file for complete search history.

(56) References Cited

U.S. PATENT DOCUMENTS

| | | | | |
|---|---|---|---|---|
| 9,582,524 | B1* | 2/2017 | Murali | G06F 16/214 |
| 9,607,020 | B1* | 3/2017 | Bosco | G06F 16/27 |
| 9,715,434 | B1* | 7/2017 | Xu | G06F 3/067 |
| 11,182,260 | B1* | 11/2021 | Beier | G06F 11/2094 |
| 2015/0128152 | A1* | 5/2015 | Lachaume | G06F 9/4488 |
| | | | | 719/316 |
| 2017/0061027 | A1* | 3/2017 | Chesla | G06F 16/258 |
| 2018/0095953 | A1* | 4/2018 | Mayer | G06F 16/214 |

FOREIGN PATENT DOCUMENTS

WO    WO-2014031101 A1 *    2/2014    ....... G06F 17/30079

* cited by examiner

*Primary Examiner* — Diedra McQuitery
(74) *Attorney, Agent, or Firm* — Buckley, Maschoff & Talwalkar LLC (57) ABSTRACT

A system and method providing database level migration of an application and associated data. In one embodiment, the method may include deploying a new data structure, a first database trigger to capture data written to an old data structure and to write the captured data to the new data structure, and a bulk migration stored procedure to a database instance; deploying, in response to a conclusion of an execution of the bulk migration stored procedure, a second database trigger to the database instance to capture data written to the new data structure and to write the captured data to the old data structure; deploying a second version of the application; routing validation data to the second version of the application to validate an expected operation thereof; and routing, in response to a completion of the validation, production data for the database instance to the second version of the application.

20 Claims, 13 Drawing Sheets

```
┌─────────────────────────────────────────────────────────────┐
│ DEPLOY AT LEAST ONE NEW DATA STRUCTURE, A FIRST DATABASE    │
│ TRIGGER TO CAPTURE DATA WRITTEN TO AT LEAST ONE OLD DATA    │
│ STRUCTURE AND TO WRITE THE CAPTURED DATA TO THE NEW DATA    │
│ STRUCTURE, AND A STORED PROCEDURE TO EXECUTE A BULK         │
│ MIGRATION OF DATA FROM THE AT LEAST ONE OLD DATA STRUCTURE  │
│ TO THE NEW DATA STRUCTURE                              305  │
└─────────────────────────────────────────────────────────────┘
                              │
                              ▼
┌─────────────────────────────────────────────────────────────┐
│ DEPLOY, IN RESPONSE TO A CONCLUSION OF AN EXECUTION OF THE  │
│ BULK MIGRATION STORED PROCEDURE, A SECOND DATABASE TRIGGER  │
│ TO CAPTURE DATA WRITTEN TO THE AT LEAST ONE NEW DATA        │
│ STRUCTURE AND TO WRITE THE CAPTURED DATA TO THE AT LEAST    │
│ ONE OLD DATA STRUCTURE                                 310  │
└─────────────────────────────────────────────────────────────┘
                              │
                              ▼
┌─────────────────────────────────────────────────────────────┐
│ DEPLOY, BY THE DEPLOYMENT ORCHESTRATOR, A SECOND            │
│ VERSION OF THE APPLICATION                                  │
│                                                        315  │
└─────────────────────────────────────────────────────────────┘
                              │
                              ▼
┌─────────────────────────────────────────────────────────────┐
│ ROUTE, BY A ROUTER, VALIDATION DATA TO THE SECOND           │
│ VERSION OF THE APPLICATION, THE VALIDATION DATA BEING       │
│ PROCESSED BY THE SECOND VERSION OF THE APPLICATION USING    │
│ THE AT LEAST ONE NEW DATA STRUCTURE TO VALIDATE AN          │
│ EXPECTED OPERATION OF THE SECOND VERSION OF THE APPLICATION │
│                                                        320  │
└─────────────────────────────────────────────────────────────┘
                              │
                              ▼
┌─────────────────────────────────────────────────────────────┐
│ CONFIGURE THE ROUTER, IN RESPONSE TO A COMPLETION OF        │
│ THE VALIDATION OF THE EXPECTED OPERATION OF THE SECOND      │
│ VERSION OF THE APPLICATION, TO ROUTE PRODUCTION DATA FOR    │
│ THE DATABASE INSTANCE TO THE SECOND VERSION OF THE          │
│ APPLICATION                                            325  │
└─────────────────────────────────────────────────────────────┘
```

CREATE COLUMN TABLE BOOKS (ID INT PRIMARY KEY, AUTHOR VARCHAR(255)) ;

905

910

ALTER TABLE BOOKS ADD (AUTHOR_NAME VARCHAR(255));

CREATE TRIGGER books_insert_sync_author_author_name BEFORE INSERT ON BOOKS REFERENCING NEW ROW newbook

```
BEGIN
    IF :newbook.author IS NOT NULL THEN
        newbook.author_name = :newbook.author;
    ELSE
        newbook.author = :newbook.author_name;
    END IF;
END;
```

1005

CREATE TRIGGER books_update_author_name_from_author BEFORE UPDATE OF AUTHOR ON BOOKS REFERENCING NEW ROW newbook

```
BEGIN
    newbook.author_name = :newbook.author;
END;
```

1010

CREATE TRIGGER books_update_author_from_author_name BEFORE UPDATE OF AUTHOR_NAME ON BOOKS REFERENCING NEW ROW mynewrow

```
BEGIN
    newbook.author = :newbook.author_name;
END;
```

```
CREATE PROCEDURE "migrate_books_author_to_author_name_primitive"() LANGUAGE
SQLSCRIPT SQL SECURITY INVOKER AS

BEGIN

UPDATE books SET author_name =
author WHERE author_name IS NULL°OR author_name <> author;

END
```
1105

```
CREATE PROCEDURE "migrate_books_author_to_author_name"() LANGUAGE SQLSCRIPT
SQL SECURITY INVOKER as
BEGIN
                            1115
    DECLARE CURSOR
c_books for SELECT id from books WEHER author_name IS NULL OR author_name
<> author;

FOR book AS c_books DO
                                        1120
        BEGIN autonomous transaction
            UPDATE books SET author_name = author WHERE id = book.id;
        END;
    END FOR;
END
```
1110

DATABASE-DRIVEN ZERO DOWNTIME DATA MIGRATION

BACKGROUND

Many state-of-the art cloud applications utilize, for example, trunk-based development and daily deliveries to continuously supply their customers with new features and updates to the cloud applications. The schema of a database associated with a continuously updated application may need to evolve to support changes to the application. In some instances, cloud service providers hosting cloud applications might typically agree to provide upwards of 99.99 percent application uptime to their customers. Consistent with the promised uptime, the frequent application deployments should not cause any designed downtime, otherwise the cloud provider might not meet their promised application availability.

Blue-green deployment is an application deployment approach designed to transfer production (e.g., customer) traffic from a previous (e.g., "blue") version of an application to a newer (e.g., "green") version of the application, without any noticeable downtimes. The database for the application is typically a shared resource between the blue deployment and the green deployment of the application and a schema for the database needs to be compatible with both the blue and green versions of the application to ensure full functionality of both versions since both versions are operational for at least a period of time. In some aspects, refactoring a database schema may involve migrating data in existing data structures into new data structures.

In the context of cloud applications there are challenges in migrating database data to new data structures to support deployments of different versions of a cloud application while also achieving zero perceived downtime. Therefore, there exists a need for an improved mechanism for migrating data to a database with a different schema with zero perceived downtime.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 12 is an illustrative block diagram of a computing system, in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

FIGS. 1A-1E depict various aspects of an application-based data migration scheme. In the database migration scheme illustrated in FIGS. 1A-1E, the orchestration of accessing old data structures 105 initially accessed by a first version 115 of an application and new data structures 110 that will be accessed and used by a new deployments of the application, as well as data migration, is accomplished by the deployed application itself. That is, the functionality for the orchestration of accessing the old and new data structures and the data migration is accomplished by coded features of the application (e.g., FIGS. 1B and 1C where application version 125 includes and executes a bulk migration procedure 130).

Figure 1A:
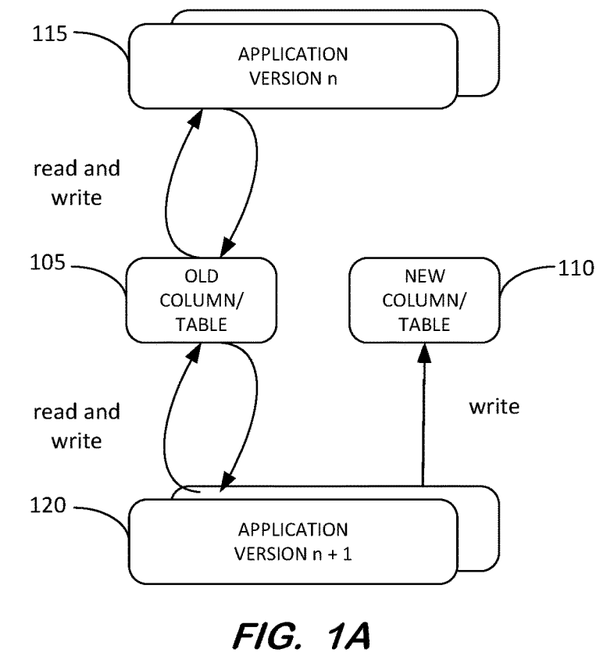
FIGS. 1A-1E depict various aspects of an application-based data migration scheme.
Figure 1B:
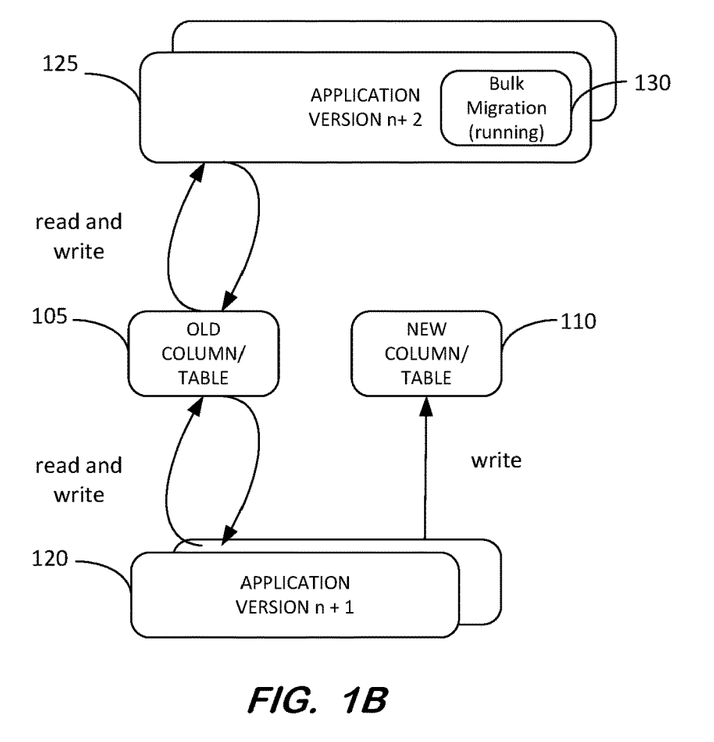
Figure 1C:
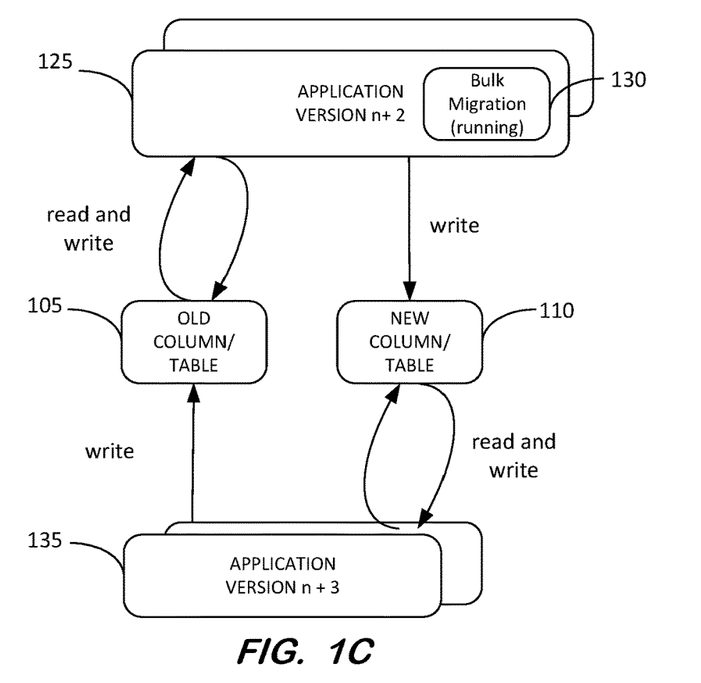
Figure 1D:
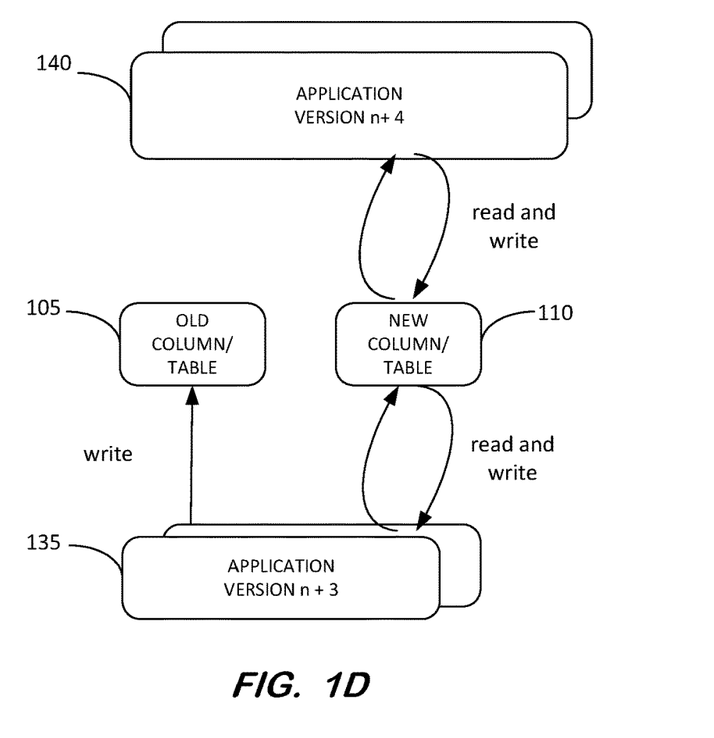
Figure 1E:
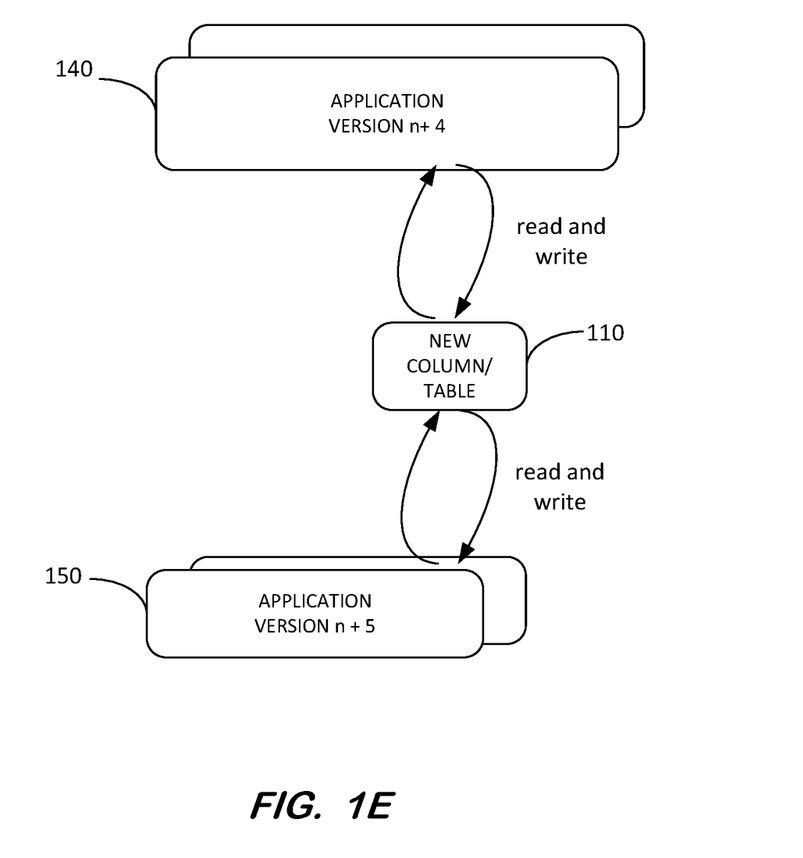

In some aspects, the orchestration of accessing old and new data and data migration is accomplished in application code in the application-based data migration scheme depicted in FIGS. 1A-1E. FIG. 1*a* illustrates a starting point 1 where application version n 115 and application version n+1 120 both read/write to old data structure(s) 105, but application version n+1 120 alone writes to the new data structure(s) 110. FIG. 1B illustrates the bulk migration is performed by code 130 of the application version n+2 125. Here, both the old application version 120 and the new version 125 write to the new data structure(s) 110, but the production traffic is still routed to the old tables 105. Continuing to FIG. 1C, the data migration process includes a switch over to application version n+3 135 that writes to the old data structure(s) 105 but reads/writes to the new data structure(s) 110. In FIG. 1D, application version n+4 1140 reads/writes to the new data structure(s) 110. The migration cycle concludes in FIG. 1E, wherein application version n+4 140 alone reads/writes to the production traffic to the new data structure(s) and the old data structure(s) has been removed. Deployment of application version n+5 may indicate the start of a next migration cycle of the application-based data migration scheme depicted, in part, in FIGS. 1A-1E.

Thus, the migration process managed in the application code requires, as shown in in FIGS. 1A-1E, multiple deployment cycles, where the application is aware of the multiple different intermediate states (versions) that adds to the complexity of this type of application based migration process.

In some aspects, systems and processes of a database level migration process disclosed herein are removed from and completely transparent to the application code. In some instances, these aspects may result in the disclosed database level migration systems and processes having less complexity relative to application-based migration schemes. Less complexity may contribute to a system/process that is less susceptible to errors, based at least in part, on some embodiments including only a single a new application version deployment.

Figure 2:
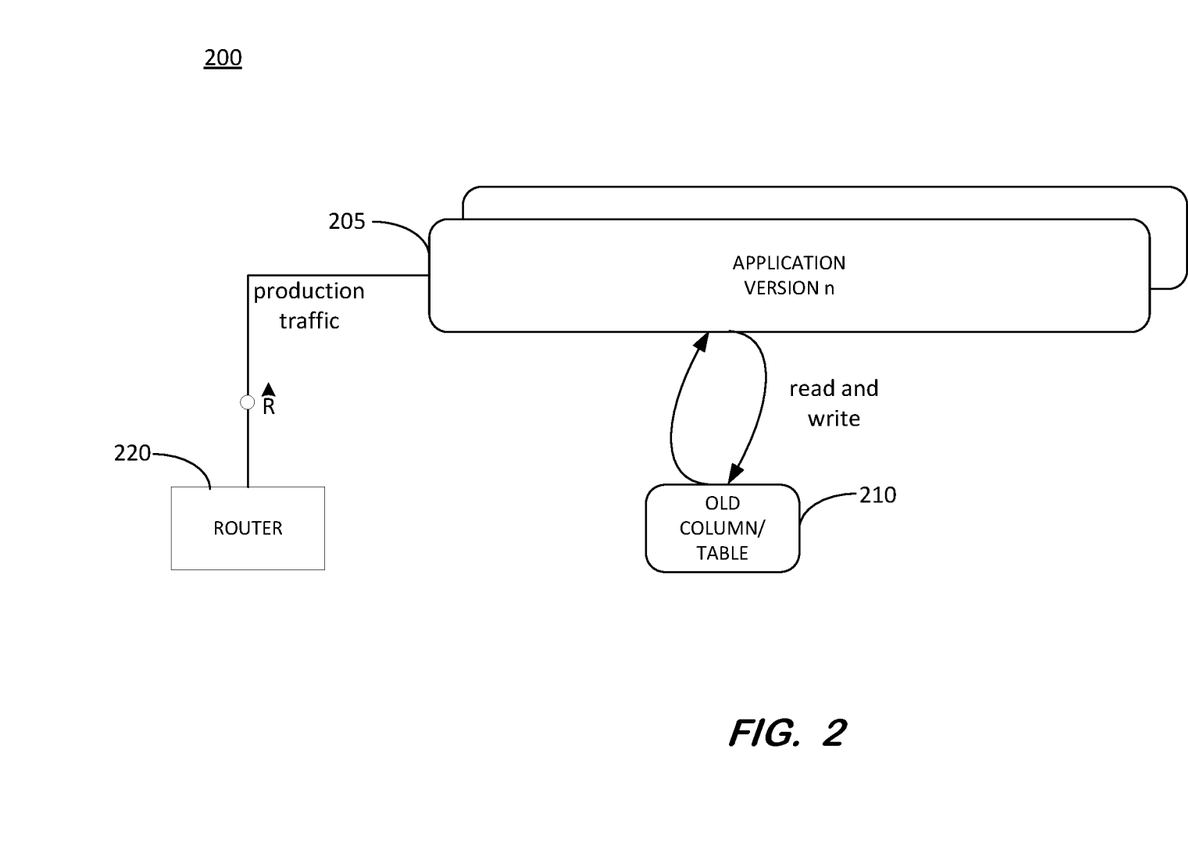
FIG. 2 is an illustrative diagram of a system that supports database level data migration, in accordance with an example embodiment.

FIG. 2 is an illustrative diagram of a system 200 that may support a database level data migration process disclosed herein in blue-green deployment context, in accordance with an example embodiment. System 200 includes a cloud application (also referred to as an application) version 205, denoted as version n. As used herein, different versions of an application may each have an identifier associated therewith such as, for example, version n, version n+1, version n+2, etc. The identifier associated with each version of an application may serve to distinguish the different versions from each other, as opposed to indicate any particular feature of function of the version of the application unless otherwise stated. In the context of the blue-green deployment, application version 205 may be referred to as a "blue" version of the application.

Application version 205 accesses an existing (i.e., "old") data structure 210. The old data structure 210 may be hosted by a cloud-based database instance 220, wherein application version 205 has access rights to read from and write data to the old data structure and the database instance 215 has a particular data schema. A router 220 receives external traffic (e.g., customer traffic) and routes production traffic to application 205. In some aspects, system 200 may depict some aspects of a blue-green deployment before the start of a data migration cycle (i.e., a starting point for a data migration cycle).

Figure 3:
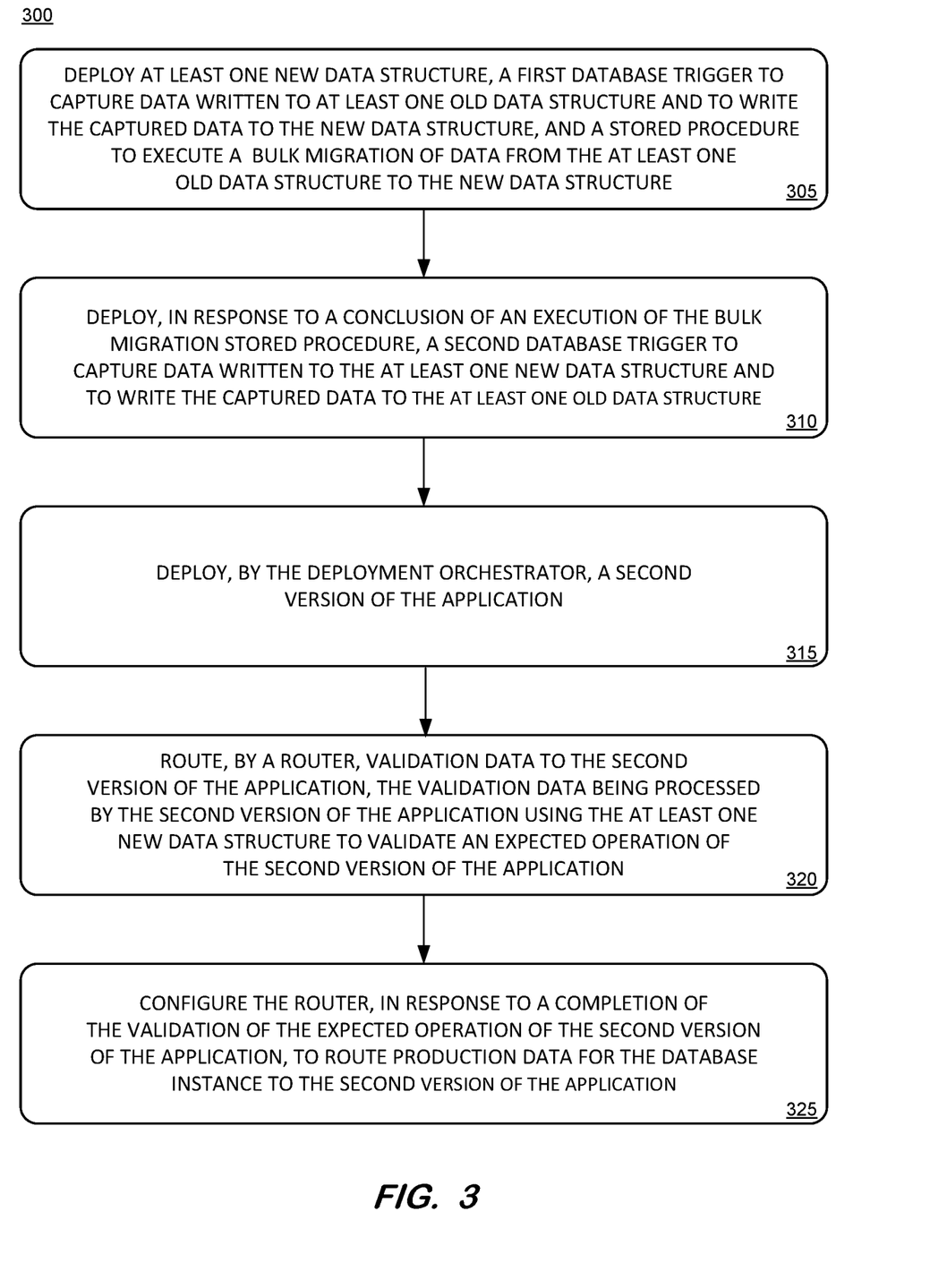
FIG. 3 is an illustrative flow diagram for database level data migration process, in accordance with an example embodiment.

FIG. 3 is an illustrative flow diagram for a database level data migration process 300, in accordance with an example embodiment. Process 300 will be discussed in conjunction with FIGS. 4-8 that depict various aspects, configurations, and sequences of operations corresponding to at least some of the database level data migration process 300.

Figure 4:
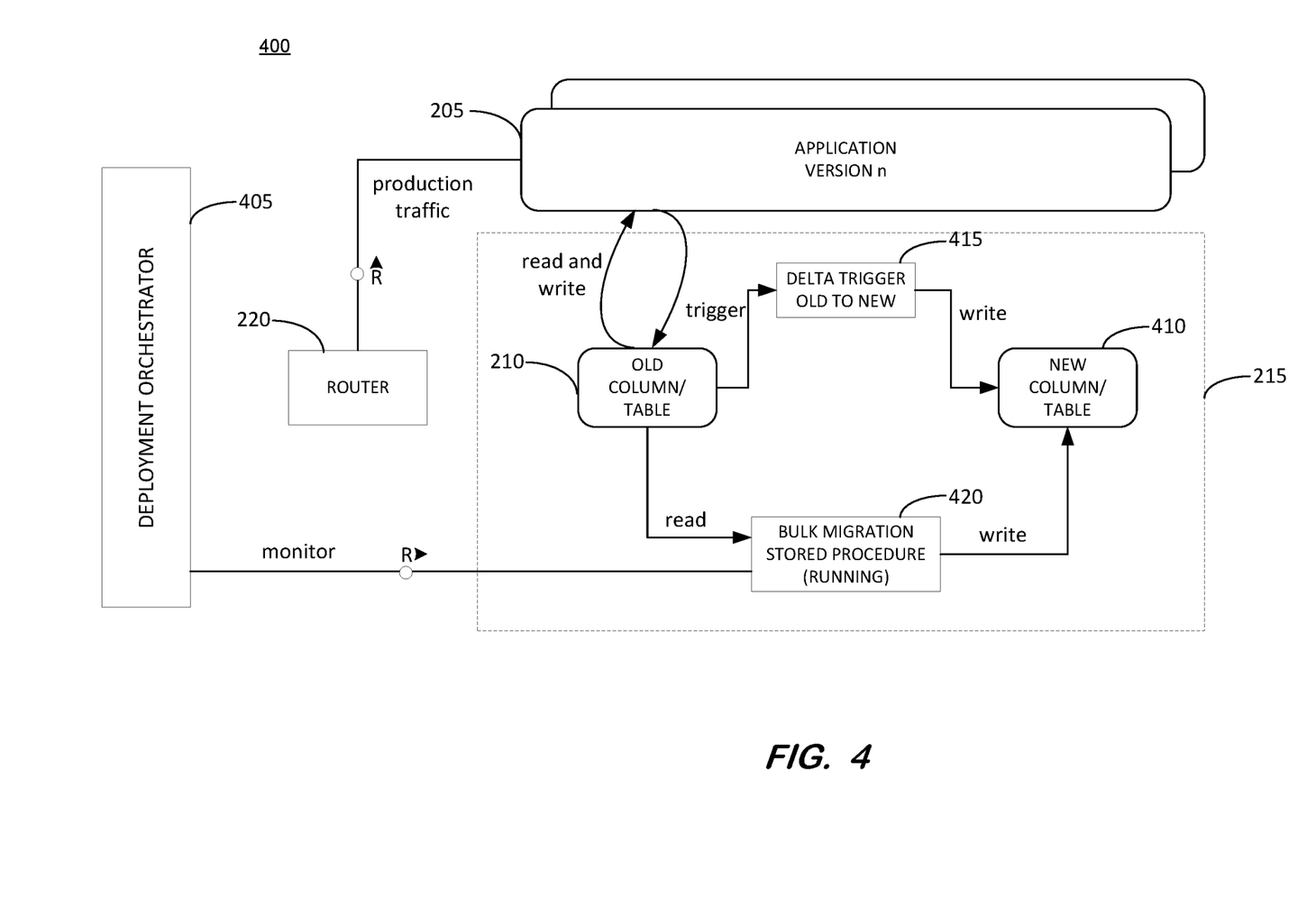
FIG. 4 is an illustrative diagram of a system depicting a first sequence of operations for a database level data migration process, in accordance with an example embodiment.

FIG. 4 is an illustrative diagram of a system 400 depicting a first sequence of operations included in step 305 shown in FIG. 3 for the database level data migration process 300, in accordance with an example embodiment. System 400 includes application version 205 (version n), old data structure 210 of database instance 215, and router 220, as disclosed above in the discussion of FIG. 2.

At operation 305 of FIG. 3, a deployment orchestrator 405 controls deployment of a new version of the application for database instance 410 and operates to deploy certain database artifacts to the database instance 215, including an empty new data structure 410, a database trigger 415, and a bulk migration stored procedure 420.

In some embodiments, an old data structure and a new data structure herein may each include at least one data structure (e.g., table, column, object, or other data entity) unless stated otherwise.

Database trigger 415 operates to capture data written to old data structure 210 by application version 205 (i.e., changes to the old data structure) and write the captured data to new data structure 410 within a same database transaction. In some embodiments, all the data written to old data structure 210 (i.e., "touched") by application version 205 is captured by database trigger 415 and populates new data structure 410. In this manner, all the data touched on the database level is populated in new data structure 410. In some aspects, new data structure 410 might include, for example, an existing table of the old data structure 210 having a new column added thereto, a new table, some refactoring of columns of an existing table in old data structure 210, combinations thereof, etc.

In a non-limiting example of the new data structure 410 including new column(s) added to a table of old data structure 210, the old data structure table has a single column for a first name and a last name whereas the new data structure will include a table having a first column for the first name and a second column for the last name. Note that the data migration process(es) disclosed herein are not affected or otherwise constrained by the particular types data entities (e.g., a new column added to an existing table, a new table, etc.) included in a new data structure of some embodiments herein.

In some instances, not all of the data in the old data structure 210 is touched by the current processing of the running production traffic by application version 205. Deployment orchestrator 405 further operates to start an execution of the bulk migration stored procedure 420 and monitors the execution of the bulk migration stored procedure, wherein the running or executing bulk migration stored procedure reads the "untouched" data from old data structure 210 and writes it to new data structure 410.

Note that while bulk migration stored procedure 420 is executing during step 305 of process 300, application version 205 is operating as normal including reading/writing data from/to old data structure 210, without any downtime or restrictions on access to the data of the old data structure.

When the bulk migration stored procedure 420 is finished migrating data of step 305, deployment orchestrator 405 validates or confirms that all of the (pre-existing) data that was in old data structure 210, as well as any data acquired by the old data structure during the data migration step 305, is now also in new data structure 410. In this manner, the old data structure 210 and new data structure 410 may be assured of being in sync.

Figure 5:
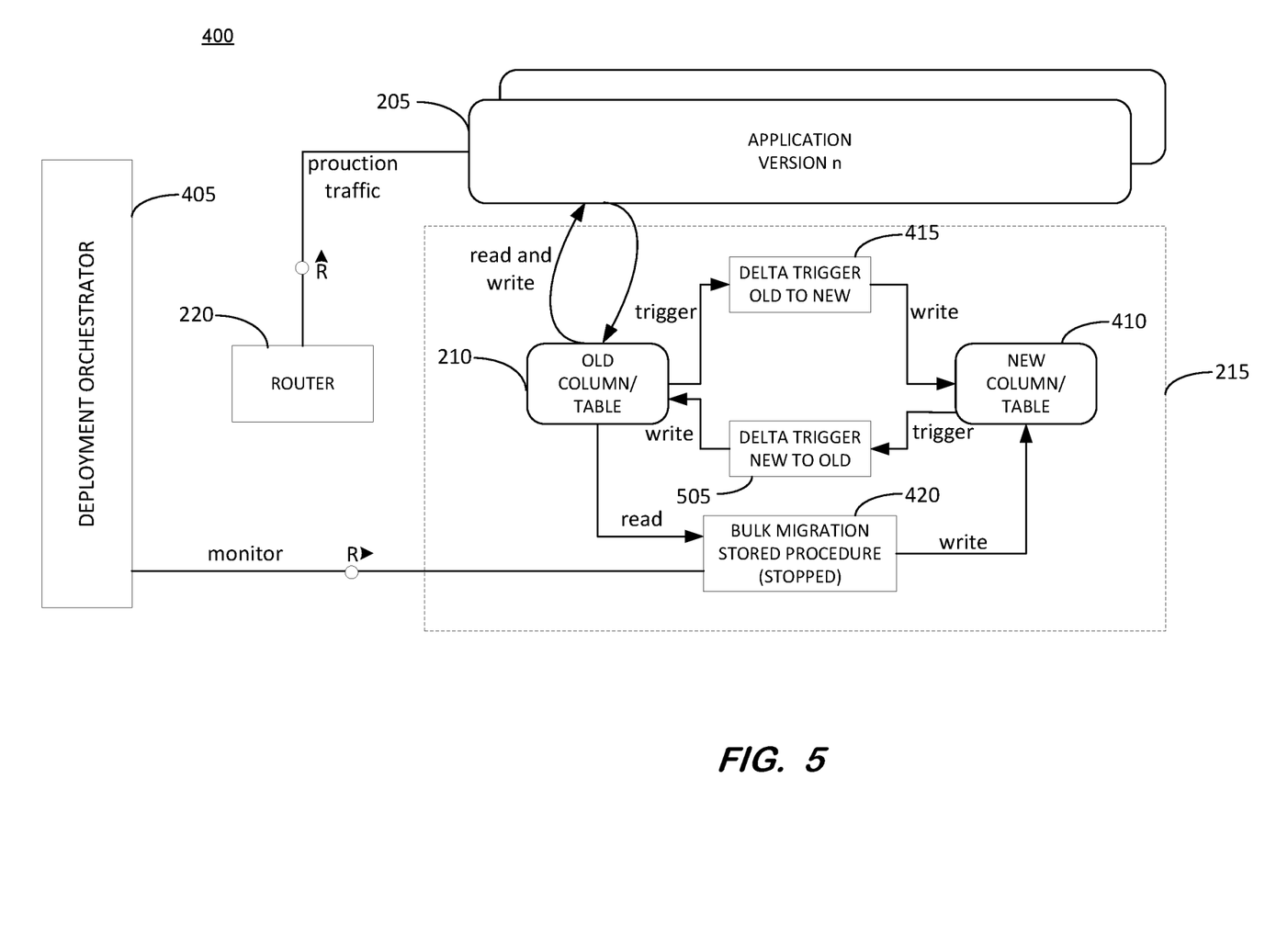
FIG. 5 is an illustrative diagram of a system depicting a second sequence of operations for a database level data migration process, in accordance with an example embodiment.

FIG. 5 is an illustrative diagram of the system 400 depicting a second sequence of operations included in step 310 for the database level data migration process 300, in accordance with an example embodiment.

At operation 310 of FIG. 3, in response to a conclusion of the execution of the bulk migration stored procedure 420 (i.e., all data of the old data structure has been validated as being written to the new data structure), a second database trigger 505 is deployed to the database instance 215 by deployment orchestrator 405. Database trigger 505 operates to capture all data written to new data structure 410 and write this captured data to old data structure 210 within a same database transaction. In this manner, new data structure 410 and old data structure 210 may be automatically synchronized in both directions. That is, the first database trigger 415 and the second database trigger 505 operate to completely and bi-directionally synchronize the new and old data structures within the same database transaction.

In some embodiments, database instance 215 or a function of an infrastructure hosting the database instance might operate or provide functionality to avoid endless loops of reading and writing the same data between old data structure 210 and the new data structure 410 in the data migration process(es) disclosed herein.

Note that the sequence of operations included in steps 305 and 310 of process 300 do not include or depend on new application code of application version 205. Also, during steps 305 and 310 of process 300, application version 205 operates as usual/normal.

Figure 6:
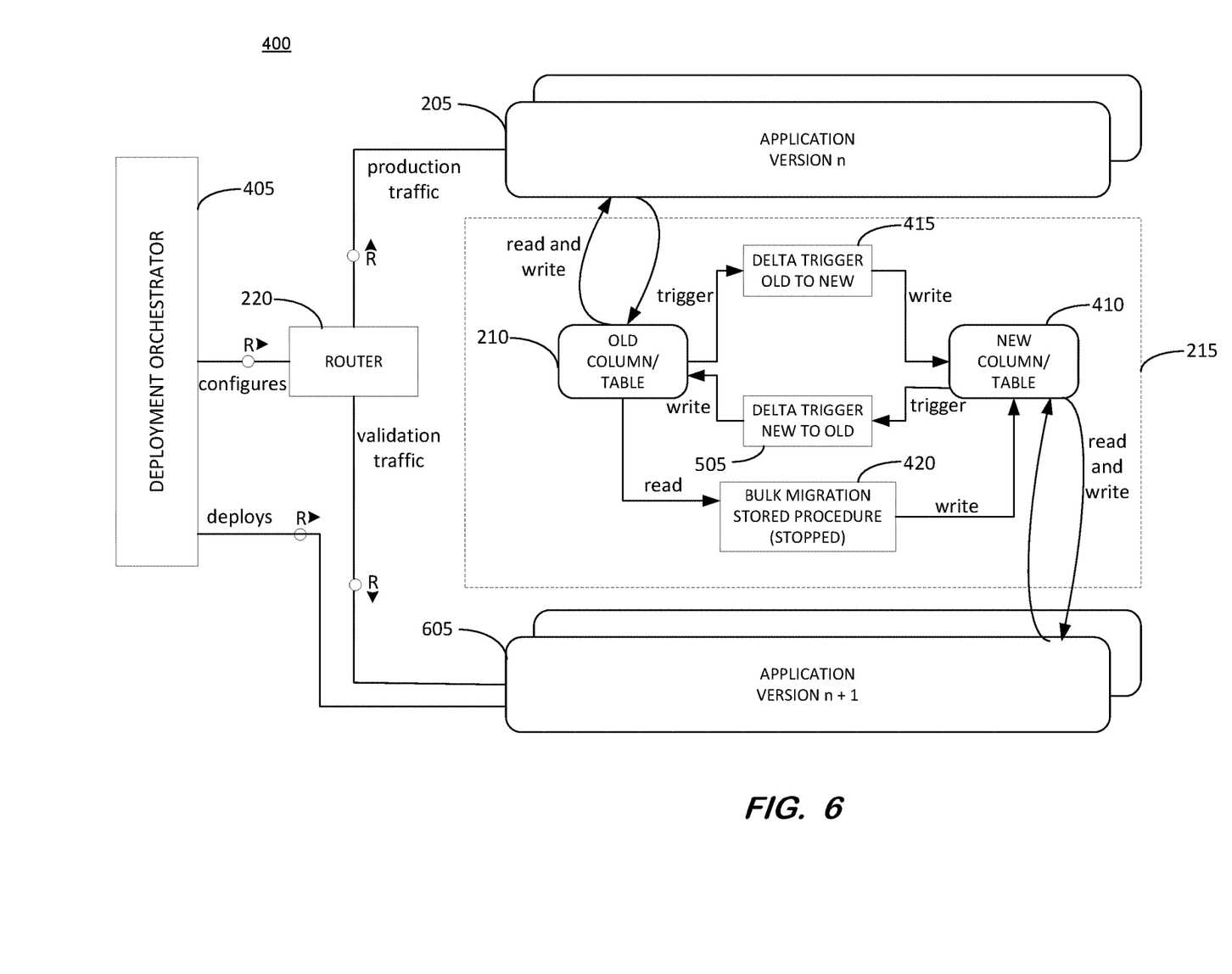
FIG. 6 is an illustrative diagram of a system depicting a third second sequence of operations for a database level data migration process, in accordance with an example embodiment.

FIG. 6 is an illustrative diagram of the system 400 depicting a third second sequence of operations included in step 315 for the database level data migration process 300 of FIG. 3, in accordance with an example embodiment.

At step 315 of FIG. 3, a new application version 605 (i.e., "green" version), denoted as n+1, is deployed by deployment orchestrator 405. At step 320 of process 300, router 220 is configured to route validation traffic to application version 605, whereas production traffic is still routed to application version 205, as shown in FIG. 6. In some embodiments, the validation traffic might comprise, for example, test traffic, data for certain test tenants, or other types and configurations of validation data. The validation traffic is used to validate or confirm that the new application version 605 works in production, in an expected manner (e.g., accurately, error-free, and reliably). As shown in FIG. 6, in some embodiments, application version 605 only reads and writes to new data structure 410 for validation testing purposes.

Figure 7:
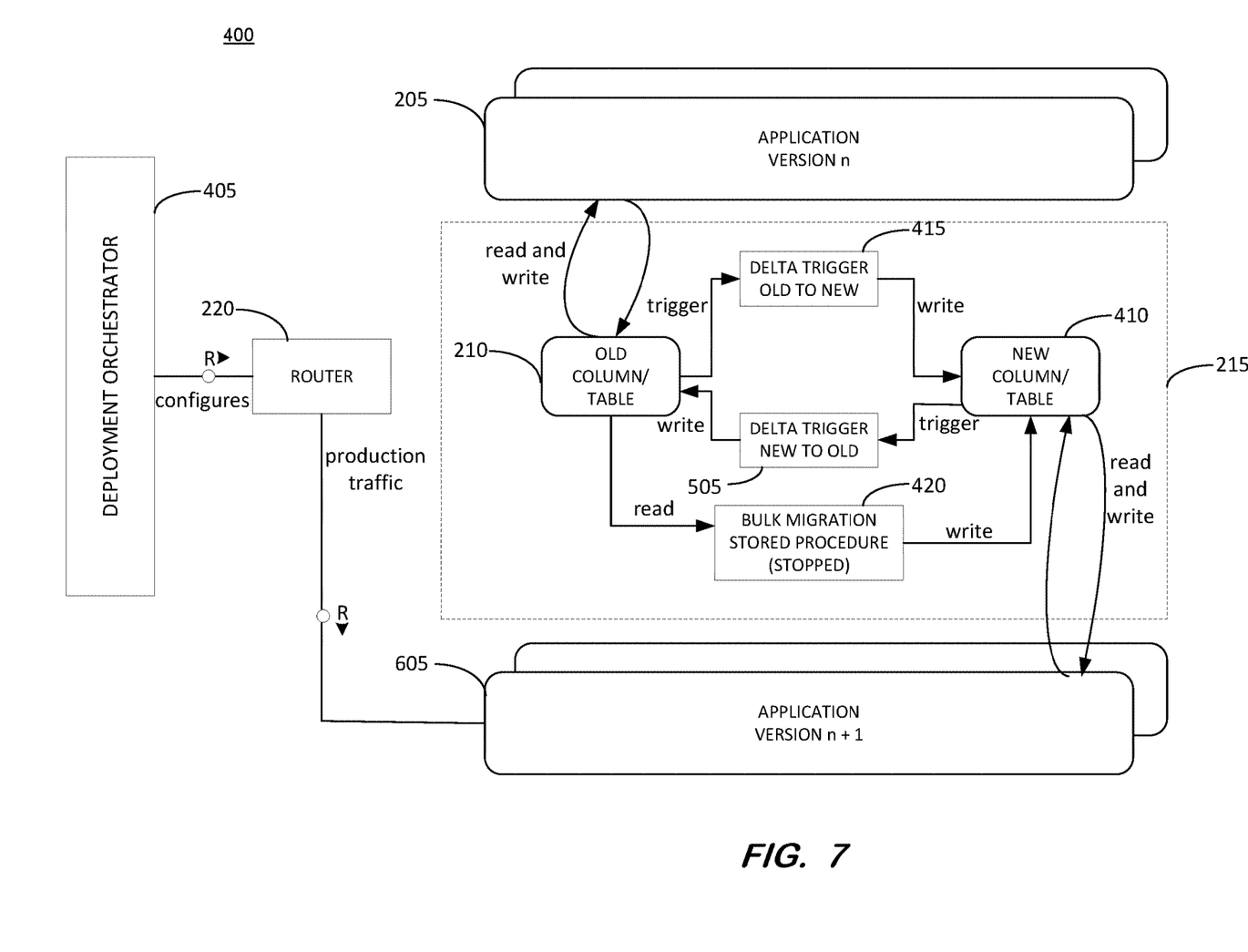
FIG. 7 is an illustrative diagram of a system depicting a fourth sequence of operations for a database level data migration process, in accordance with an example embodiment.

FIG. 7 is an illustrative diagram of the system 400 depicting a fourth sequence of operations included in step 325 for the database level data migration process 300, in accordance with an example embodiment.

At step 325 of FIG. 3, router 215 is (re)configured, in response to a completion of the validation of the expected (i.e., successful) operation of the new application version 605 to route production traffic for the database instance 215 to the new application version 605. In some aspects, database triggers 415 and 505 deployed earlier and configured to bidirectionally synchronize the old data structure 210 and the new data structure 410, may provide a mechanism and support for switching production traffic back to application version 205, if desired and/or needed. Note that production traffic might be reverted back to application version 205 since the old data structure is maintained up to date by the operation of the two database triggers 415 and 505, as prescribed hereinabove.

In some embodiments, steps 305-325 of process 300 demonstrate one deployment migration cycle. Having completed the data migration for a database instance supporting the deployment of a new application version 605, the old data structure 210 may be removed from database instance 215 after production traffic is switched over to the new application version 605. In some instances, the old data structure may be removed from the database instance at least before, or possibly as part of, a next deployment migration cycle.

Note that in some aspects, the initial application version 205 is serving production traffic throughout the complete deployment flow of process 300, as shown in FIGS. 4-7, without any downtime of application version 205. Also, note that only two versions of the application may be needed to complete to migration cycle, in accordance with some embodiments of FIG. 3.

Figure 8:
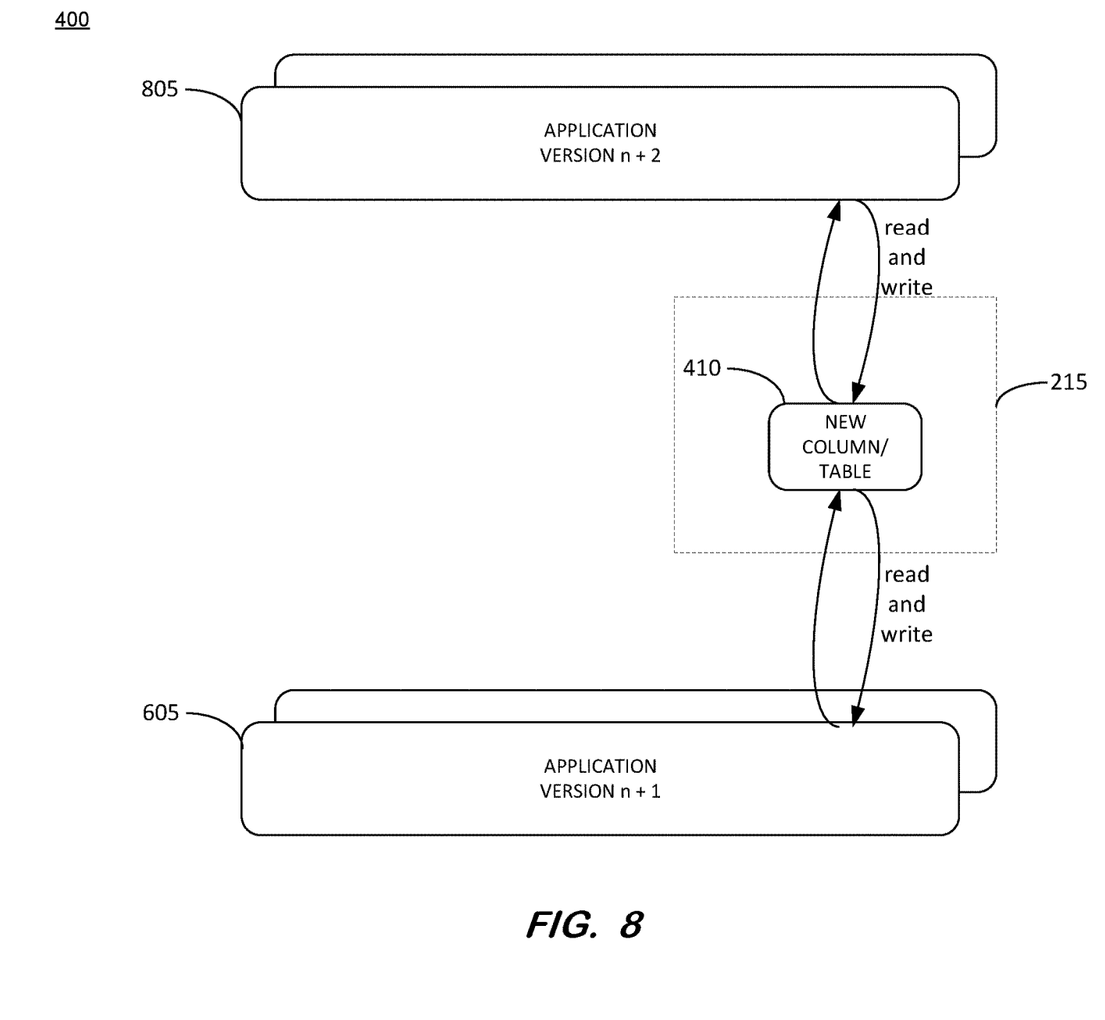
FIG. 8 is an illustrative diagram of a system configured for a next migration cycle of a database level data migration process, in accordance with an example embodiment.

FIG. 8 is an illustrative diagram of some aspects of the system 400 configured for a next cycle of a database level data migration process (e.g., FIG. 3, process 300), in accordance with an example embodiment. As shown, old data structure 210 is removed from database instance 215 so that new data structure 410 can be used by a next new application version 805 (i.e., version n+2). Deployment of application version 805 may be executed using the same steps of process 300 disclosed above. Note that old data structure 210 is removed for a next deployment migration cycle because in deploying application version 805, system 400 is migrating from application version 605 to application version 805 and application version 205 will no longer be a fallback option for production traffic for the database instance 215. Consequently, the old data structure 210 formerly used by application version 205 will no longer be used or needed and can thus be removed without impacting future operations of the database instance.

In some embodiments, one or more policies and/or rules may be established, specified, and observed for a data migration process disclosed herein to support efficient and error-free database schema migration. In one aspect, only compatible changes to data are allowed, where compatible refers to permissibly adding nullable columns to existing tables or adding new tables. Other changes such as, for example, renaming a table is considered incompatible. Another aspect that may be adhered to in some embodiments is that the application code of the application being deployed should be able to tolerate the compatible database schema changes in a forward-compatible manner. Further, in some embodiments, a mapping of the new and old data structures should be bijective (i.e., there is a one-to-one correspondence in the data structures) so that there can be a fallback or switching between application versions and thus their data structures, if need be or desired. In yet another aspect, a bulk migration process disclosed herein may be idempotent so that it can recover from, for example, interrupted executions that might occur during (long) running executions of the data migration process(es) disclosed herein.

In some embodiments, the bulk migration process(es) disclosed herein may operate to minimize or eliminate data locks on database tables. In some instances, including large data volumes, the bulk migration of the data volume might include dividing the migration into multiple, smaller independent migration transactions, in an effort to avoid any designed downtime during the data migration process.

Figure 9:
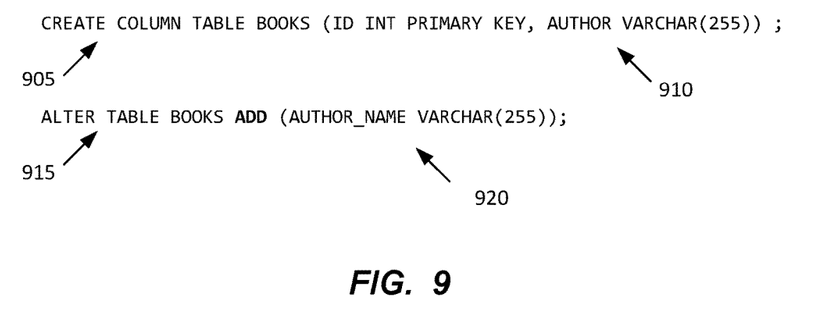
FIG. 9 is an illustrative example listing of code to create database tables, in accordance with an example embodiment.
Figure 10:
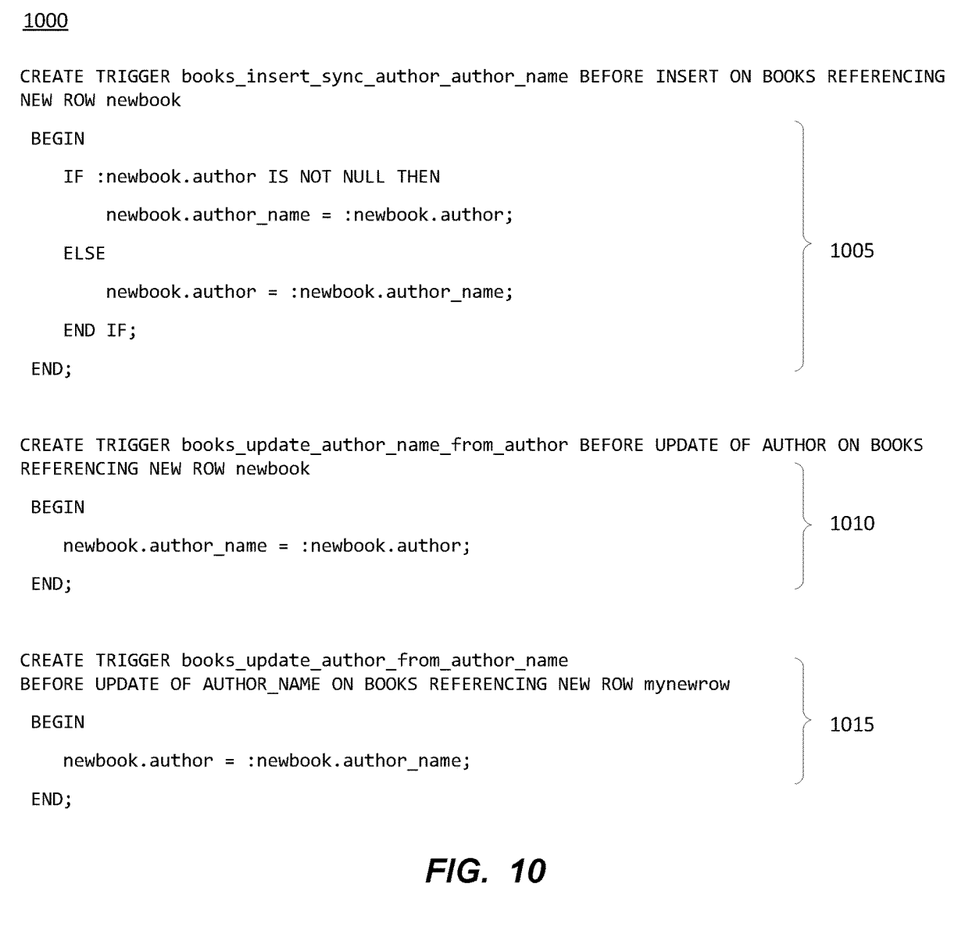
FIG. 10 is an illustrative example listing of code to create database triggers, in accordance with an example embodiment.
Figure 11:
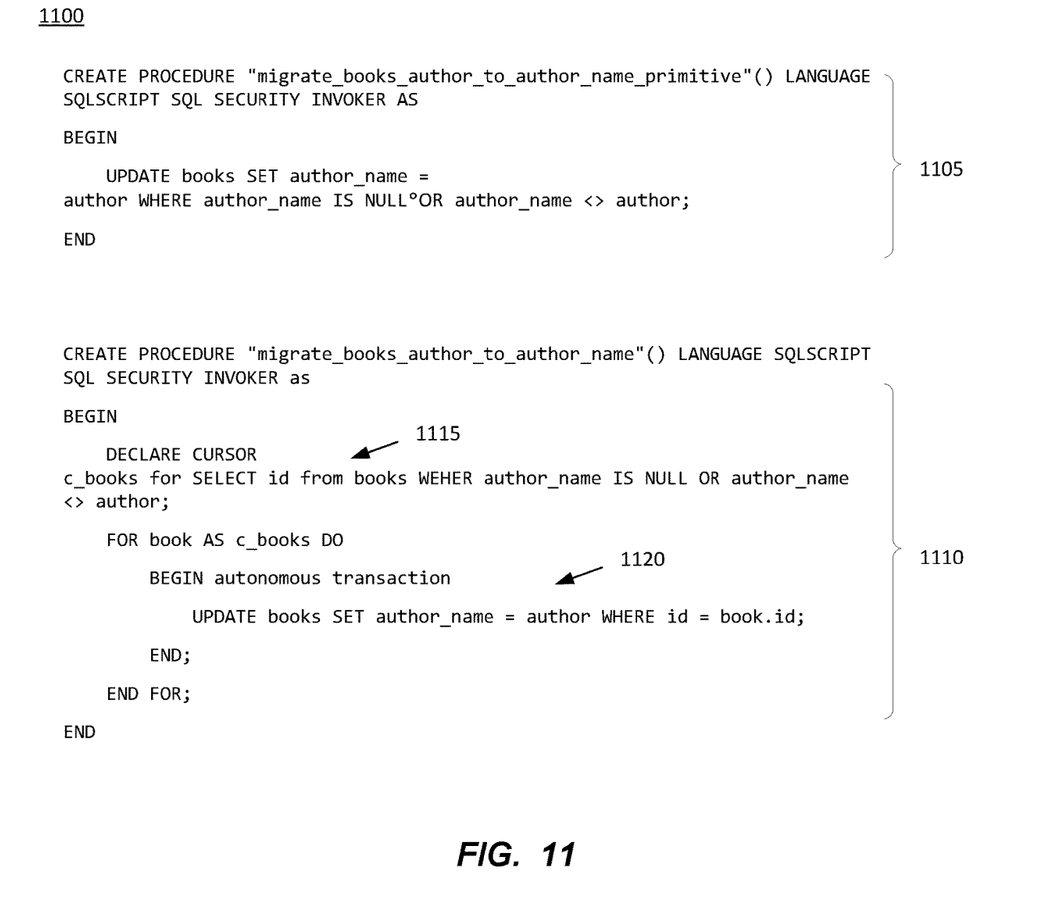
FIG. 11 is an illustrative example listing of code for variants of a database migration procedure, in accordance with an example embodiment.

FIGS. 9-11 each include an illustrative example listing of code to demonstrate some aspects of an example embodiment herein. In particular, the code listings include examples to create database triggers and migration procedures in accordance with an embodiment of a database schema data migration process herein. The code listings are provided for an example "books" table data structure having an "author" field (e.g., column) that is to be effectively renamed to "author_name", while also observing the guiding principles outlined herein (e.g., a table column cannot be renamed, although columns may be added to a table).

Referring to FIG. 9, illustrative example SQL DDL (Direct Definition Language) statements to define database schema objects are listed. The statement at 905 creates a column in the "books" table defined to have a primary key and a "author". At some later time, it is desired to rename the "author" column to "author_name". However, recall that one of the guiding principles for some embodiments of a data migration process herein may include not being able to directly rename a column. As such, the statement 915 specifies the "books" table is altered to add the "author_name" column to the table at 920. In this manner, the new "books" table will have both an "author" column and an "author_name" column, which will support, for example, data synchronization between the old data structure and the new data structure and fallback operations, if needed.

FIG. 10 is an illustrative listing of example code 1000 to create database triggers, in accordance with an example embodiment including the "books" table created and altered per FIG. 9. Code 1005 creates a database trigger to copy new data from the old data structure (i.e., the "books" table version with just the "author" column) to the new data structure (i.e., the "books" table version with the "author" column and the "author_name" column). Code 1010 creates a database trigger that listens for updates on the "author" column and updates the new "author_name" column, whereas code 1015 creates a database trigger that listens for updates on the new "author_name" column and updates the "author" column. Accordingly, FIG. 10 demonstrates the database triggers that might be utilized in a data migration process (e.g., process 300) in some embodiments herein.

FIG. 11 is an illustrative example listing of code 1100 for two variants of a database migration procedure, in accordance with an example embodiment. Code 1105 defines a procedure to perform all migrations in one transaction and code 1110 defines a database procedure with migrations in separate transactions per object. Code 1105 defines a primitive procedure with all migrations in one transaction that updates the "books" set "author_name" where the "author_name" is null or it is not equal to "author" and makes sure that the data structures are in sync. Note that this migration process is running in one transaction and might require short-term locks of the "books" table during its operation. Code 1110 defines a second procedure with migrations in separate transaction per object that might be used to avoid the short-term data locks on the "books" table that might be experienced with migration procedure 1105. Procedure 1110 uses separate transactions so that the production traffic will not be affected since the production traffic depends on the complete of the migration. As seen at 1115, this procedure selects the records that have not been migrated (instead of the entire "books" set as done by of procedure 1105). This procedure then invokes an autonomous transaction 1120 to loop over the selected record(s) and locks only the particular records being migrated (i.e., operated on), as opposed to all of the records in the "books" table.

The foregoing code listings are illustrative examples of some database schema definitions and procedures that might be implemented to effectuate one or more features of the present disclosure and are neither exhaustive of the embodiments nor limiting to the scope of the present disclosure.

Figure 12:
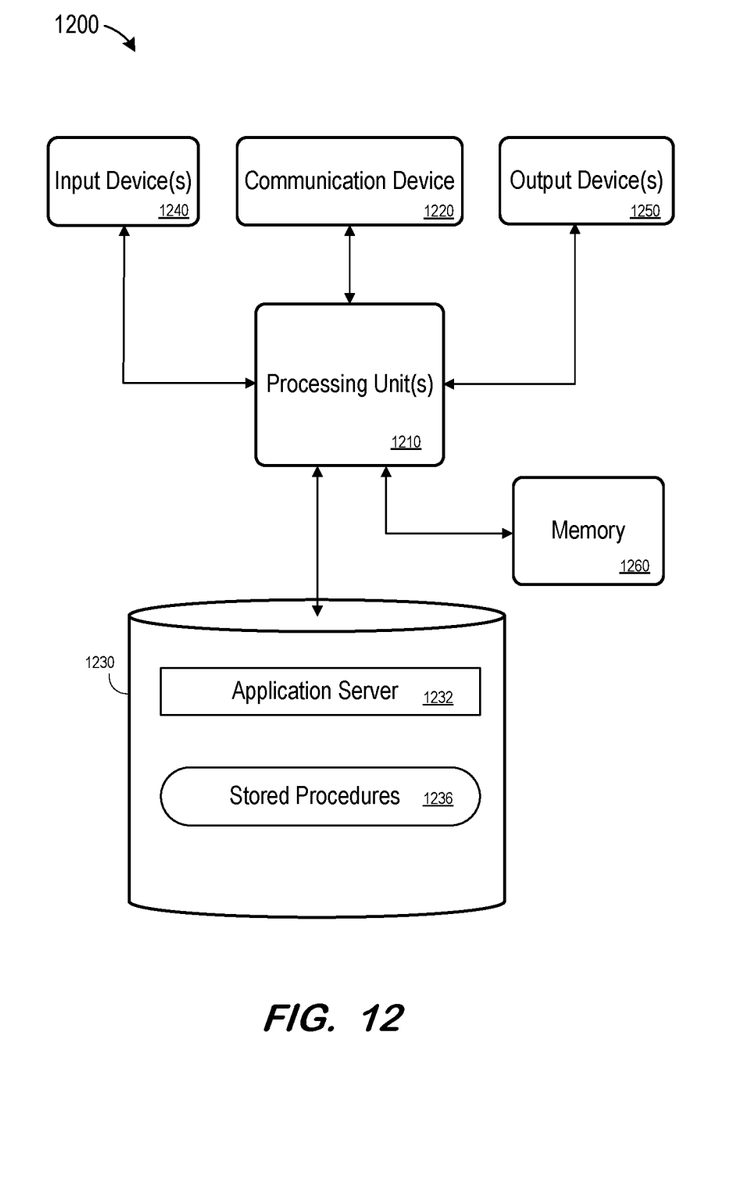

FIG. 12 illustrates a computing system 1200 that may be used in any of the methods and processes described herein, in accordance with an example embodiment. FIG. 12 is a block diagram of server node 1200 embodying a database level data migration including an evolving data schema, according to some embodiments. Server node 1200 may comprise a general-purpose computing apparatus and may execute program code to perform any of the functions described herein. Server node 1200 may comprise an implementation of at least some aspects of process 300 in FIG. 3 in some embodiments. Server node 1200 may include other unshown elements according to some embodiments.

Server node 1200 includes processing unit(s) 1210 operatively coupled to communication device 1220, data storage device 1230, one or more input devices 1240, one or more output devices 1250, and memory 1260. Communication device 1220 may facilitate communication with external devices, such as an external network or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Application server 1232 may each comprise program code executed by processor(s) 1210 to cause server 1200 to perform any one or more of the processes described herein. Such processes may include generation and configuration of one or more database triggers for a database instance, the configuration and reconfiguring of a router to serve production data in accordance with aspects and processes disclosed herein, and the execution of one of stored procedures to implement one or more bulk migration processes in accordance with aspects and processes disclosed herein. Embodiments are not limited to execution of these processes by a single computing device. Data storage device 1230 may also store data and other program code for providing additional functionality and/or which are necessary for operation of server 1200, such as device drivers, operating system files, etc. DBMS 1236 may store and manage a variety of data types and data structures, including, for example, stored procedures.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code; and
a processor to execute the processor-executable program code in order to cause the system to:
deploy, by a deployment orchestrator of a database instance, at least one new data structure, a first database trigger to capture data written to at least one old data structure by a first version of an application and to write the captured data to the new data structure, and a stored procedure of the database instance to execute a bulk migration of data from the at least one old data structure to the new data structure;
deploy, by the deployment orchestrator in response to a conclusion of an execution of the bulk migration stored procedure, a second database trigger to capture second data written to the at least one new data structure and to write the captured second data to the at least one old data structure;
deploy, by the deployment orchestrator, a second version of the application;
route, by a router, validation data to the second version of the application, the validation data being processed by the second version of the application using the at least one new data structure to validate an expected operation of the second version of the application; and
configure the router, in response to a completion of the validation of the expected operation of the second version of the application, to route production data for the database instance to the second version of the application.

2. The system of claim 1, further comprising the processor to execute the processor-executable program code in order to cause the system to remove, no later than an initiation of a next migration cycle for a deployment of a third version of the application, the at least one old data structure from the database instance.

3. The system of claim 1, wherein the first version of the application is fully operational, including access to data of the old data structure, during the deployment of the at least one new data structure, the first database trigger, and the bulk migration stored procedure.

4. The system of claim 1, wherein the first database trigger and second database trigger operate to avoid endless loops of reading and writing data to the at least one old data structure and the at least one new data structure.

5. The system of claim 1, wherein the validation of the expected operation of the second version of the application is implemented, at least in part, by a test automation procedure of the database instance.

6. The system of claim 1, wherein no more than the first version of the application and the second version of the application are concurrently deployed by the deployment orchestrator.

7. The system of claim 1, wherein the migration of data from the at least one old data structure to the new data structure by the stored procedure of the database instance is executed in multiple, independent migration transactions.

8. A computer-implemented method, the method comprising:
executing a database procedure to deploy at least one new data structure to a database instance, a first database trigger to capture data written to at least one old data structure of the database instance by a first version of an application and to write the captured data to the new data structure, and a stored procedure of the database instance to execute a bulk migration of data from the at least one old data structure to the new data structure;
executing a database procedure to deploy, in response to a conclusion of an execution of the bulk migration stored procedure, a second database trigger to capture second data written to the at least one new data structure and to write the captured second data to the at least one old data structure;
executing a database procedure to deploy a second version of the application;
configuring a router to route validation data to the second version of the application, the validation data being processed by the second version of the application using the at least one new data structure to validate an expected operation of the second version of the application, while production data for the database instance is routed to the first version of the application; and
reconfiguring the router, in response to a completion of the validation of the expected operation of the second version of the application, to route production data for the database instance to the second version of the application.

9. The method of claim 8, further comprising removing from the database instance, no later than an initiation of a next migration cycle for a deployment of a third version of the application, the at least one old data structure.

10. The method of claim 8, wherein the first version of the application is fully operational, including access to data of the old data structure, during the deployment of the at least one new data structure, the first database trigger, and the bulk migration stored procedure.

11. The method of claim 8, wherein the first database trigger and second database trigger are configured to avoid endless loops of reading and writing data to the at least one old data structure and the at least one new data structure.

12. The method of claim 8, wherein the validation of the expected operation of the second version of the application is implemented, at least in part, by a test automation procedure of the database instance.

13. The method of claim 8, wherein no more than the first version of the application and the second version of the application are concurrently deployed by the deployment orchestrator.

14. The method of claim 8, wherein the migration of data from the at least one old data structure to the new data structure by the stored procedure of the database instance is executed in multiple, independent migration transactions.

15. A non-transitory, computer readable medium storing instructions, which when executed by at least one processor cause a computer to perform a method comprising:
   synchronizing data of a first version of an application written to at least one new data structure with at least one old data structure;
   executing a bulk migration of unsynchronized data from the at least one old data structure to the new data structure;
   synchronizing, in response to a conclusion of the execution of the bulk migration, data written to the at least one new data structure with the at least one old data structure;
   deploying a second version of the application;
   routing validation data to the second version of the application, the validation data being processed by the second version of the application using the at least one new data structure to validate an expected operation of the second version of the application; and
   reconfiguring the router, in response to a completion of the validation of the expected operation of the second version of the application, to route production data for a database instance to the second version of the application.

16. The medium of claim 15, further comprising removing, no later than an initiation of a next migration cycle for a deployment of a third version of the application, the at least one old data structure from the database instance.

17. The medium of claim 15, wherein no more than the first version of the application and the second version of the application are concurrently deployed.

18. The medium of claim 15, wherein the synchronizing of data between the at least one old data structure and the at least one new data structure operates to avoid endless loops of reading and writing data therebetween.

19. The medium of claim 15, wherein the validation of the expected operation of the second version of the application is implemented, at least in part, by a test automation procedure of the database instance.

20. The medium of claim 15, wherein the migration of data from the at least one old data structure to the new data structure is executed in multiple, independent migration transactions.

* * * * *